(12) United States Patent
Huang et al.

(10) Patent No.: US 8,048,965 B2
(45) Date of Patent: Nov. 1, 2011

(54) METHOD FOR EXTENDING SHELF LIFE OF VINYL ESTER RESIN OR UNSATURATED POLYESTER RESIN

(75) Inventors: Feng-Mao Huang, Nan-Tou (TW);
Shih-Wen Yur, Nan-Tou (TW);
Ming-Zhou Chuang, Nan-Tou (TW)

(73) Assignee: Swancor Inc. Co., Ltd., Nan-Tou (TW)

( * ) Notice: Subject to any disclaimer, the term of this patent is extended or adjusted under 35 U.S.C. 154(b) by 188 days.

(21) Appl. No.: 12/512,547

(22) Filed: Jul. 30, 2009

(65) Prior Publication Data

US 2011/0028659 A1 Feb. 3, 2011

(51) Int. Cl.
*C08F 8/06* (2006.01)

(52) U.S. Cl. ............... 525/388; 252/186.1; 252/186.38; 252/186.43; 525/368; 525/386; 528/490; 210/758; 210/759; 210/763; 422/7; 422/9; 422/10; 422/129

(58) Field of Classification Search .............. 525/388, 525/368, 386
See application file for complete search history.

(56) References Cited

U.S. PATENT DOCUMENTS

| | | | | |
|---|---|---|---|---|
| 3,736,260 | A | * | 5/1973 | O'Sullivan ............ 524/62 |
| 4,549,969 | A | * | 10/1985 | Gerlach et al. ........ 210/759 |
| 5,707,424 | A | * | 1/1998 | Tom et al. ............ 95/95 |

FOREIGN PATENT DOCUMENTS

WO WO 93/17054 * 9/1993

* cited by examiner

*Primary Examiner* — Vasu Jagannathan
*Assistant Examiner* — Robert C Boyle
(74) *Attorney, Agent, or Firm* — Muncy, Geissler, Olds & Lowe, PLLC

(57) ABSTRACT

Disclosed is a method for extending a shelf life of vinyl ester resin or unsaturated polyester resin during transportation or general storage. The method includes the step of enhancing an oxygen content of the vinyl ester resin or the unsaturated polyester resin, such that the self-polymerization reaction of reactive functional groups having carbon-carbon unsaturated double bonds of the vinyl ester resin or the unsaturated polyester resin can be minimized, so as to slow down occurrence of a gelation phenomenon of the vinyl ester resin or the unsaturated polyester resin in a long-time transportation or storage, and further to decrease a monetary loss.

2 Claims, No Drawings

METHOD FOR EXTENDING SHELF LIFE OF VINYL ESTER RESIN OR UNSATURATED POLYESTER RESIN

BACKGROUND OF THE INVENTION

1. Field of the Invention

The present invention relates generally to a method for storing vinyl ester resin or unsaturated polyester resin and more particularly, to a method for extending the shelf life of the vinyl ester resin or the unsaturated polyester resin.

2. Description of the Related Art

Carbon-carbon unsaturated double bonds of the molecular structure of vinyl ester resin or unsaturated polyester resin are very easily affected by the impurities contained in the vinyl ester resin or the unsaturated polyester resin or the ambient temperature in the stage of storing the vinyl ester resin or the unsaturated polyester resin, resulting in that the carbon-carbon unsaturated double bonds break to produce free radicals which tend to conduct a chain-reaction polymerization. The higher the ambient temperature increases or the more the storage amount of the vinyl ester resin or the unsaturated polyester resin increases, the more the chain reaction of the self-polymerization through the carbon-carbon unsaturated double bonds occurs easily and extensively. As a result, a gelation phenomenon of the vinyl ester resin or the unsaturated polyester resin caused by the foregoing self-polymerization reaction occurs during transportation or general storage, resulting in a monetary loss due to deterioration of the workability of the vinyl ester resin or the unsaturated polyester resin.

In a conventional method for resolving the aforesaid problem, a free radical inhibitor is added to the vinyl ester resin or the unsaturated polyester resin to minimize the self-polymerization reaction through the carbon-carbon unsaturated double bonds, so as to extend the shelf life of the vinyl ester resin or the unsaturated polyester resin. However, the addition of the aforesaid inhibitor will reduce the reactivity of the vinyl ester resin or the unsaturated polyester resin, thus causing poor problems, for example, the processing time of the vinyl ester resin or the unsaturated polyester resin is increased, such that the whole time for manufacturing a product from the vinyl ester resin or the unsaturated polyester resin is increased, or the vinyl ester resin or the unsaturated polyester resin cannot be cured completely, such that the strength of a product manufactured therefrom fails to satisfy the standard value, undesirably increasing the defective rate. Further, if the additive amount of the inhibitor is excessive, the color of cured vinyl ester resin or cured unsaturated polyester resin becomes darkened, thus the color of a product manufactured therefrom will be darkened, undesirably degrading the appearance of the product.

In another conventional method for resolving the above-mentioned problem, the vinyl ester resin or the unsaturated polyester resin is stored in a freezer during transportation or general storage to reduce the activation energy of the carbon-carbon unsaturated double bonds of the vinyl ester resin or the unsaturated polyester resin, thereby extending the shelf life of the vinyl ester resin or the unsaturated polyester resin. However, the cost for performing the foregoing prior art method is too high, thus undesirably increasing the price of the vinyl ester resin or the unsaturated polyester resin.

SUMMARY OF THE INVENTION

The main objective of the present invention is to provide a method for extending the shelf life of the vinyl ester resin or the unsaturated polyester resin during transportation and general storage.

To achieve the above-mentioned objective, the method provided by the present invention comprises the step of enhancing the oxygen content of the vinyl ester resin or the unsaturated polyester resin. As such, when the carbon-carbon unsaturated double bonds of the vinyl ester resin or the unsaturated polyester resin break to produce free radicals due to the ambient temperature or the impurities contained in the vinyl ester resin or the unsaturated polyester resin, the oxygen may react with the free radicals to generate stable peroxyl radicals. After the free radicals are consumed by the oxygen, the self-polymerization reaction may be slow down or completely terminated, such that the probability of gelation of the vinyl ester resin or the unsaturated polyester resin is decreased, and therefore the monetary loss can be reduced.

The oxygen content of the vinyl ester resin or the unsaturated polyester resin may be enhanced by introducing a gas containing oxygen into the vinyl ester resin or the unsaturated polyester resin. For this purpose, the gas containing oxygen may be directly introduced into the vinyl ester resin or the unsaturated polyester resin through a syringe or a pump.

Alternatively, the oxygen content of the vinyl ester resin or the unsaturated polyester resin may be enhanced by a chemical reaction that can produce oxygen in the vinyl ester resin or the unsaturated polyester resin by using a plurality of chemical substances. For this purpose, the chemical substances may be added into the vinyl ester resin or the unsaturated polyester resin directly.

In one embodiment of the present invention, the gas containing oxygen may be filled in a first vessel, and then places the first vessel in a second vessel in which the vinyl ester resin or the unsaturated polyester resin is stored. Therefore, the gas containing oxygen may diffuse from the first vessel into the vinyl ester resin or the unsaturated polyester resin slowly.

Preferably, the gas containing oxygen may be, but not be limited to, air. More preferably, the gas containing oxygen may contain 92% oxygen.

In another embodiment of the present invention, the plurality of chemical substances may be deposited in a first vessel, and then places the first vessel in a second vessel in which the vinyl ester resin or the unsaturated polyester resin is stored. Therefore, the oxygen produced from a chemical reaction through the plurality of chemical substances may diffuse into the vinyl ester resin or the unsaturated polyester resin.

Preferably, the plurality of chemical substances may be, but not be limited to, calcium peroxide and methacrylic acid, and may be replaced with other known plurality of chemical substances as long as a chemical reaction, which may produce oxygen, is occurred, for example, the plurality chemical substances may be hydrogen peroxide and manganese dioxide.

Preferably, the ratio of calcium peroxide to methacrylic acid may be in a range between 1:2 and 1:0.001.

The method for extending the shelf life of the vinyl ester resin or the unsaturated polyester resin of the present invention can not only prevent manufacturing a product with a darkened color, but can also prevent the reduction of reactivity of the vinyl ester resin or the unsaturated polyester resin caused by the addition of excessive inhibitor. Further, compared to the conventional method, in which the vinyl ester resin or the unsaturated polyester resin is stored in a freezer or is stored through using an inhibitor, the method according to the present invention may effectively reduce the cost because the gas containing oxygen is inexpensive.

DETAILED DESCRIPTION OF THE INVENTION

Hereinafter, a detailed description will be given of the present invention.

The method for extending the shelf life of the vinyl ester resin or the unsaturated polyester resin during transportation and general storage according to the present invention comprises the step of enhancing an oxygen content of the vinyl ester resin or the unsaturated polyester resin. As such, the oxygen contained in the vinyl ester resin or the unsaturated polyester resin may react with the free radicals produced by breaking the carbon-carbon unsaturated double bonds of the vinyl ester resin or the unsaturated polyester resin, after which the stable peroxyl radicals may generate therefrom, so as to slow down or to terminate the self-polymerization reaction of the vinyl ester resin or the unsaturated polyester resin, resulting in that the probability of gelation is decreased.

In the method of the present invention, the step of enhancing the oxygen content of the vinyl ester resin or the unsaturated polyester resin may be accomplished by introducing a gas containing oxygen into the vinyl ester resin or the unsaturated polyester resin, or may be accomplished by a chemical reaction, which is conducted through a plurality of chemical substances to produce oxygen into the vinyl ester resin or the unsaturated polyester resin.

More specifically, in a preferred embodiment according to the present invention, the gas containing oxygen is filled in a first vessel, and then the first vessel is placed in a second vessel in which the vinyl ester resin or the unsaturated polyester resin is stored. Accordingly, the gas containing oxygen may diffuse from the first vessel into the vinyl ester resin or the unsaturated polyester resin slowly, thus enhancing the oxygen content of the vinyl ester resin or the unsaturated polyester resin.

In the present invention, the step of enhancing the oxygen content of the vinyl ester resin or the unsaturated polyester resin may be accomplished by introducing the gas containing oxygen into the vinyl ester resin or the unsaturated polyester resin through a pump or a syringe.

For the gas containing oxygen, a gas contains 92% oxygen can be used. However, the present invention is not limited to the aforesaid gas, and for example, air can be used instead.

In another preferred embodiment according to the present invention, the plurality of chemical substances may be deposited in a first vessel, and then the first vessel is placed in a second vessel which contains the vinyl ester resin or the unsaturated polyester resin therein. Accordingly, the oxygen produced from a chemical reaction through the plurality of chemical substances may diffuse into the vinyl ester resin or the unsaturated polyester resin, thus enhancing the oxygen content of the vinyl ester resin or the unsaturated polyester resin.

In the present invention, the step of enhancing the oxygen content of the vinyl ester resin or the unsaturated polyester resin may be accomplished by adding the plurality chemical substances into the vinyl ester resin or the unsaturated polyester resin directly. While the chemical reaction conducts in the vinyl ester resin or the unsaturated polyester resin, the oxygen generated therefrom may enhance the oxygen content of the vinyl ester resin or the unsaturated polyester resin.

For the chemical substances, calcium peroxide and methacrylic acid can be used. However, other known chemical substances that may react to each other to generate oxygen through a chemical reaction can be used. For example, the chemical substances may be hydrogen peroxide and manganese dioxide.

In the preferred embodiment, the ratio of calcium peroxide to methacrylic acid ranges preferably from 1:2 to 1:0.001.

A better understanding of the present invention may be obtained through the following examples, which are set forth to interpret, but are not to be construed as the limit of the present invention, and those skilled in the art will appreciate that various modifications and changes can be made without departing from the spirit of the present invention as set forth in the appended claims.

Influence of Oxygen Content on Shelf Life of Vinyl Ester Resin or Unsaturated Polyester Resin Example 1

400 g vinyl ester resin (BPA type vinyl ester resin, SW901, available from SWANCOR) was placed in a 500 mL conical flask without introducing any gas. Then, the foregoing conical flask was sealed and stored at 78° C.

Example 2

A conical flask in which vinyl ester resin is contained is provided in the same manner as in Example 1, with the exception that before the conical flask was sealed, a tube was inserted into the vinyl ester resin, and then a gas was introduced into the vinyl ester resin through the tube for 5 minutes. After which, the gas was introduced into the vinyl ester resin through the tube for 5 minutes everyday.

Example 3

The storage condition was the same as that of Example 1, with the exception that 150 g vinyl ester resin was placed in a 250 mL conical flask.

Example 4

The storage condition was the same as that of Example 2, with the exception that 150 g vinyl ester resin was placed in a 250 mL conical flask.

Comparative Example 1

A conical flask in which vinyl ester resin is contained is provided in the same manner as in Example 1, with the exception that before the conical flask was sealed, nitrogen was introduced into the vinyl ester resin through the tube for 60 minutes.

Comparative Example 2

A conical flask in which vinyl ester resin is contained is provided in the same manner as in Example 1, with the exception that before the conical flask was sealed, the tube was inserted into the conical flask but did not contact the vinyl ester resin, and then nitrogen was introduced into the conical flask through the tube for 60 minutes.

Comparative Example 3

The storage condition was the same as that of Example 1, with the exception that 150 g vinyl ester resin was placed in a 250 mL conical flask and before the conical flask was sealed, a tube was inserted into the vinyl ester resin, and then nitrogen was introduced into the vinyl ester resin through the tube for 45 minutes.

Comparative Example 4

The storage condition was the same as that of Comparative Example 1, with the exception that 150 g vinyl ester resin was placed in a 250 mL conical flask.

Comparative Example 5

The storage condition was the same as that of Comparative Example 2, with the exception that 150 g vinyl ester resin was placed in a 250 mL conical flask.

The meaning of "without introducing any gas" mentioned above is that none of any gas was introduced into the conical flask except the air already exists therein.

The results of Examples and Comparative Examples are shown in Table 1 below.

TABLE 1

|  | Shelf life (hrs) |
|---|---|
| Example 1 | 114 |
| Example 2 | 159 |
| Example 3 | 166 |
| Example 4 | 216 |
| Comparative Example 1 | 33.5 |
| Comparative Example 2 | 57.5 |
| Comparative Example 3 | 27.5 |
| Comparative Example 4 | 22 |
| Comparative Example 5 | 40 |

As is apparent from Table 1, when the oxygen within the vinyl ester resin was replaced with the introduced nitrogen, the shelf life of the vinyl ester resin decreased remarkably. Further, the shelf lives of the vinyl ester resin of Comparative Examples 1, 3 and 4, in which nitrogen was introduced into the vinyl ester resin directly, are shorter than that of the vinyl ester resin of Comparative Examples 2 and 5, in which nitrogen was introduced into the head space of the conical flasks. Furthermore, when a gas containing oxygen was introduced into the vinyl ester resin, i.e. Examples 2 and 4, the shelf lives of the vinyl ester resin are longer than that of the vinyl ester resin of Examples 1 and 3, in which none of any gas was introduced into the vinyl ester resin. Therefore, it can be seen that the oxygen content of the vinyl ester resin is capable of affecting the shelf life of the vinyl ester resin directly, that is, higher oxygen content causes longer shelf life.

PREFERRED EMBODIMENTS OF THE PRESENT INVENTION

Example 5

2.2 kg vinyl ester resin was placed in a 3 kg drum, and then a 250 mL PE bottle filled with a gas containing 92% oxygen was placed in the 3 kg drum. After which, the 3 kg drum was placed in an oven with a temperature of 60° C., so as to accelerate the experiment. The gelation of the vinyl ester resin was observed after different periods of time and the oxygen content thereof was measured through a Dissolved Oxygen Analyzer (CyberScan DO 110 Meter, available from EUTCH INSTRUMENTS) simultaneously.

Example 6

The experimental condition was the same as that of Example 5, with the exception that calcium peroxide ($CaO_2$) and methacrylic acid (MMA) were deposited in a 250 mL PE bottle.

Comparative Example 6

The experimental condition was the same as that of Example 5, with the exception that a 250 mL PE bottle was filled with 250 mL vinyl ester resin.

The results of Examples and Comparative Examples are shown in Table 2 below.

TABLE 2

| | Oxygen Content (ppm) | | | | | |
|---|---|---|---|---|---|---|
| | 0 day | 3 days | 5 days | 10 days | 20 days | 31 days |
| Example 5 | >16.9 | >16.9 | >16.9 | 9.36 | 9.55 | 5.64 (non-gelation) |
| Example 6 | >16.9 | 15.5 | 13.34 | 9.80 | 6.40 | 4.23 (non-gelation) |
| Comparative Example 6 | >16.9 | 10.8 | 12.76 | 8.59 | 6.80 | 3.81 (gelation) |

As is apparent from Table 2, the oxygen content of the vinyl ester resin of Comparative Example 6 gradually decreased depending on the storage time, and further the gelation thereof was completed at 31st day. On the other hand, although the oxygen content of the vinyl ester resin of Example 6 at 20th day is lower than that of the vinyl ester resin of Comparative Example 6, the oxygen content of the vinyl ester resin of Example 6 at 31st day is higher than that of the vinyl ester resin of Comparative Example 6. Besides, the gelation of the vinyl ester resin of Example 6 was not completed until 59th day, which was not shown in Table 2.

As stated above, the present invention is advantageous not only in effectively extending the shelf life of the vinyl ester resin or the unsaturated polyester resin during transportation or general storage, but also in reducing the cost of the storage thereof compared to the conventional method, in which the vinyl ester resin or the unsaturated polyester resin was stored in a freezer or by using an inhibitor.

What is claimed is:

1. A method for extending a shelf life of vinyl ester resin or unsaturated polyester resin, comprising the step of enhancing an oxygen content of said vinyl ester resin or said unsaturated polyester resin;
    wherein the step of enhancing the oxygen content of said vinyl ester resin or said unsaturated polyester resin is accomplished by conducting a chemical reaction that produces oxygen in said vinyl ester resin or said unsaturated polyester resin by using a plurality of chemical substances;
    wherein a first vessel in which said chemical substances are deposited is placed in a second vessel in which said vinyl ester resin or said unsaturated polyester resin is stored, such that the oxygen produced from said chemical reaction is introduced into said vinyl ester resin or said unsaturated polyester resin by diffusion;
    wherein said chemical substances comprise calcium peroxide and methacrylic acid;
    wherein the ratio of said calcium peroxide to said methacrylic acid ranges from 1:2 to 1:0.001.

2. The method as claimed in claim 1, wherein said second vessel is a PE (Polyethylene) bottle.

* * * * *